June 22, 1943.  G. A. COLLENDER  2,322,279
VEHICLE DRIVE MECHANISM
Filed March 29, 1941  5 Sheets-Sheet 1
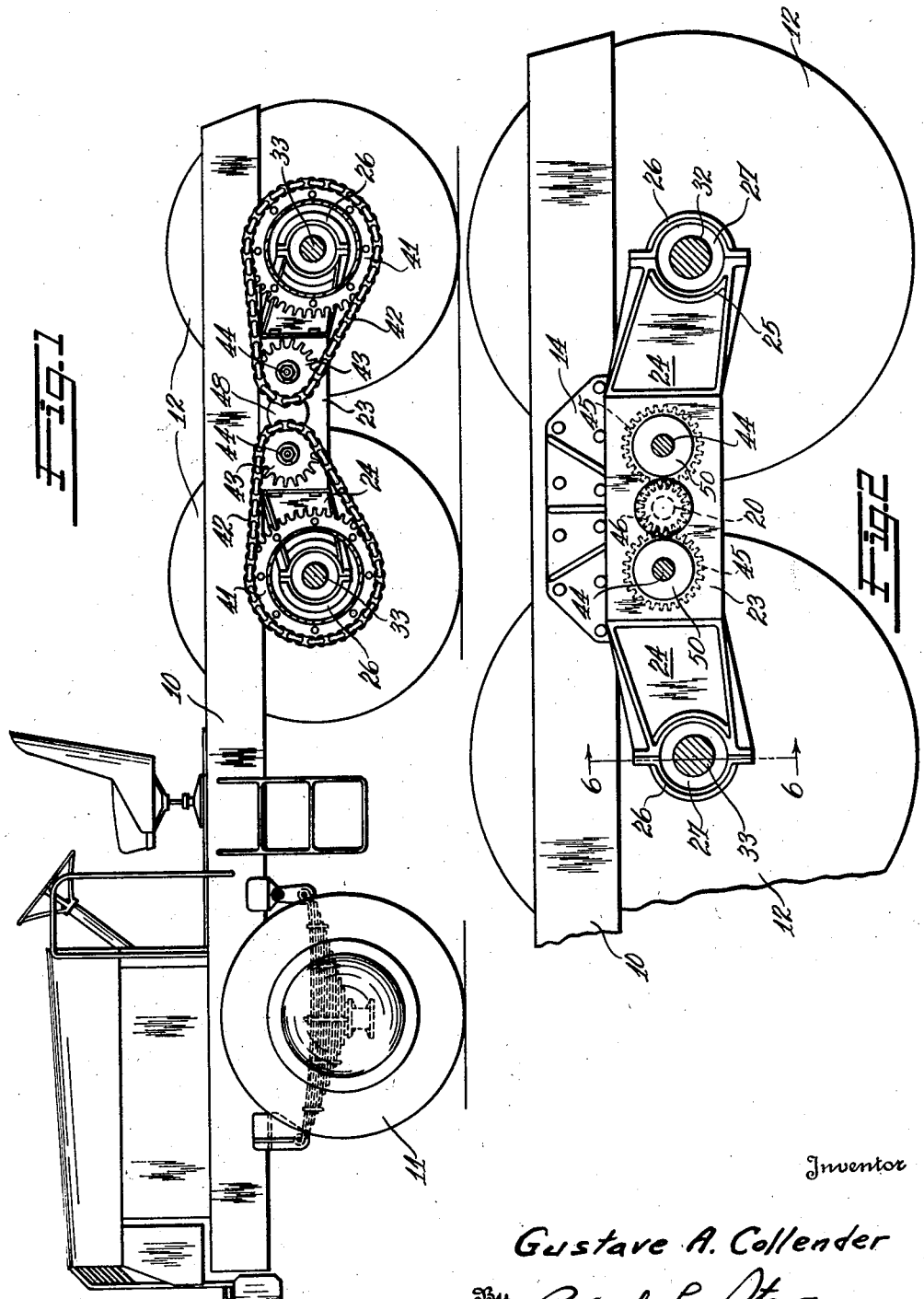
Inventor
Gustave A. Collender
By Ralph L. Stevens
Attorney

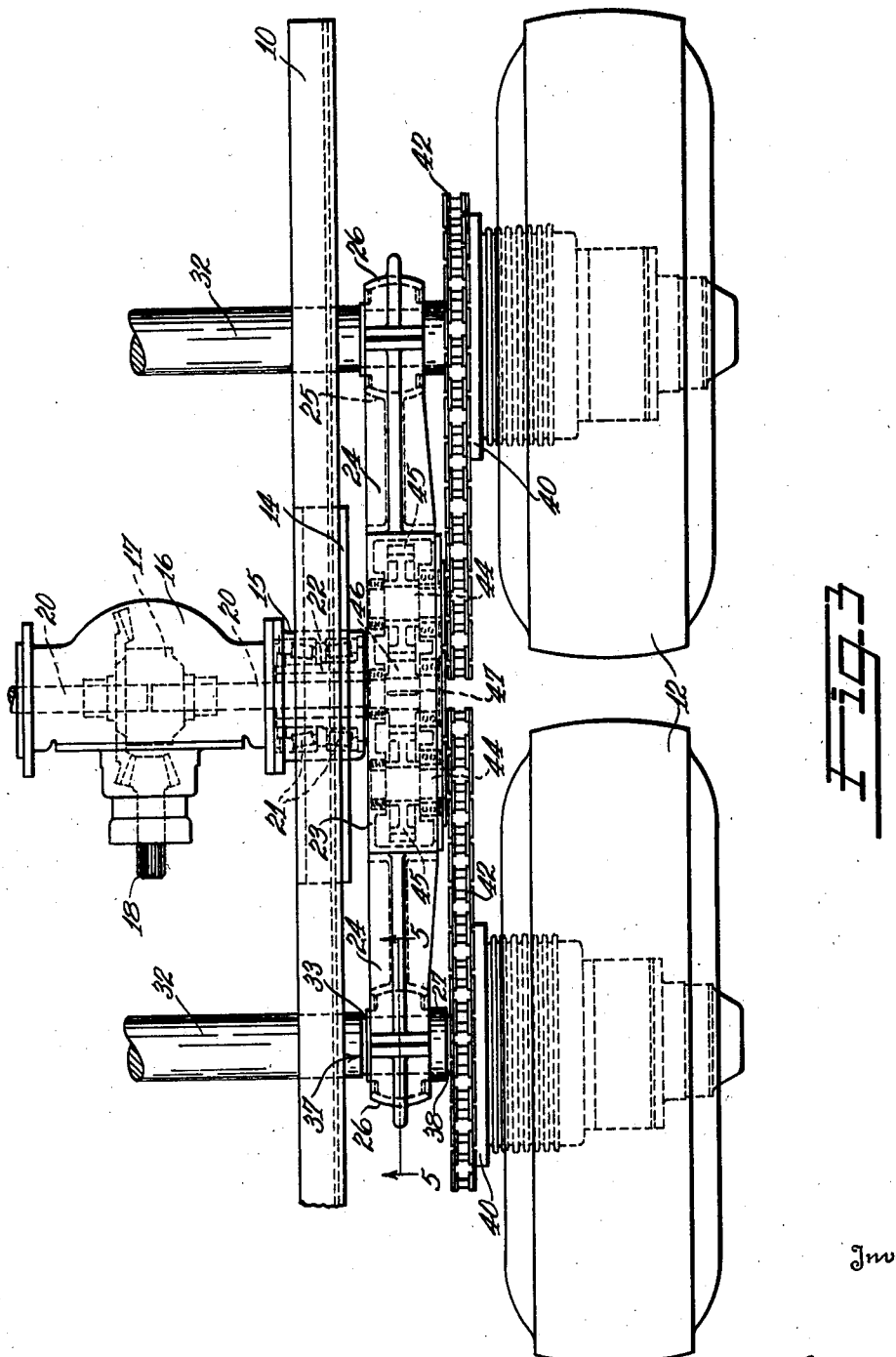

June 22, 1943.  G. A. COLLENDER  2,322,279
VEHICLE DRIVE MECHANISM
Filed March 29, 1941   5 Sheets-Sheet 3
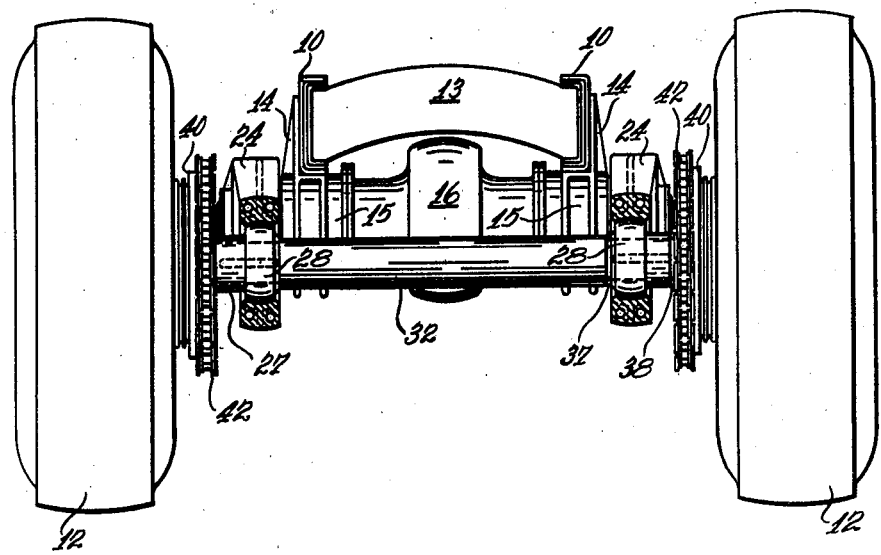
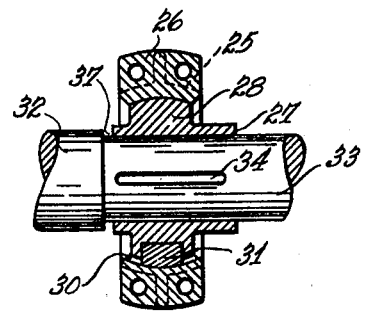
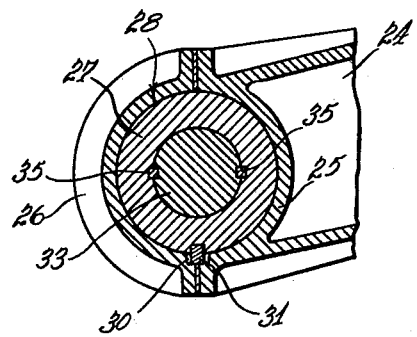
Inventor
Gustave A. Collender
By Ralph L. Stevens
Attorney

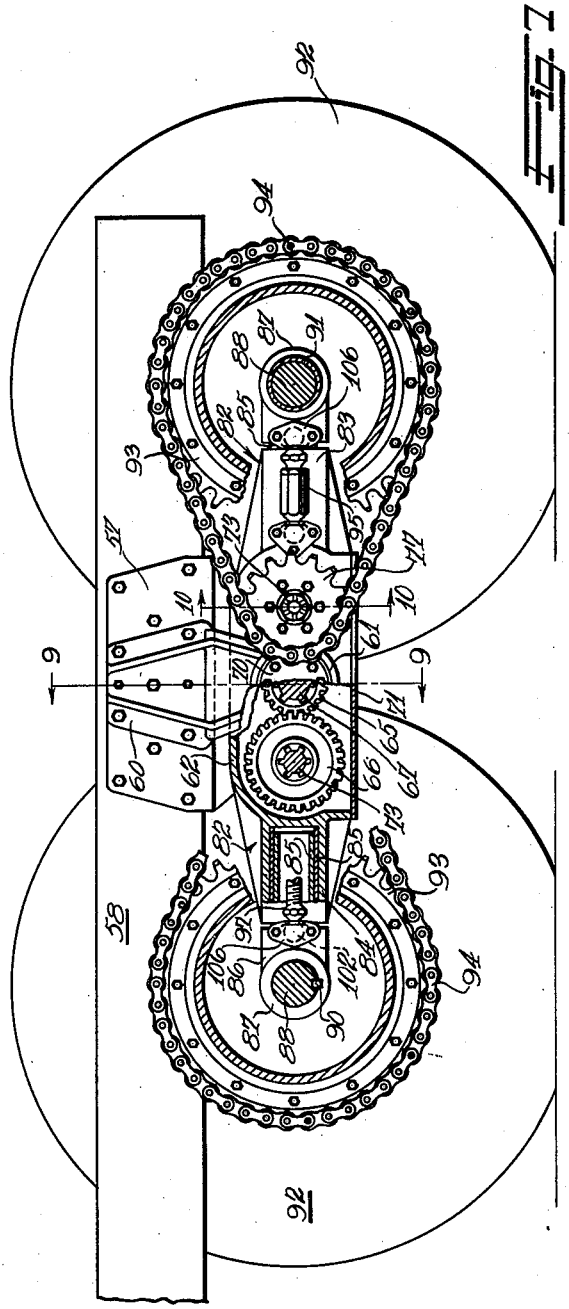

June 22, 1943.  G. A. COLLENDER  2,322,279
VEHICLE DRIVE MECHANISM
Filed March 29, 1941   5 Sheets-Sheet 5
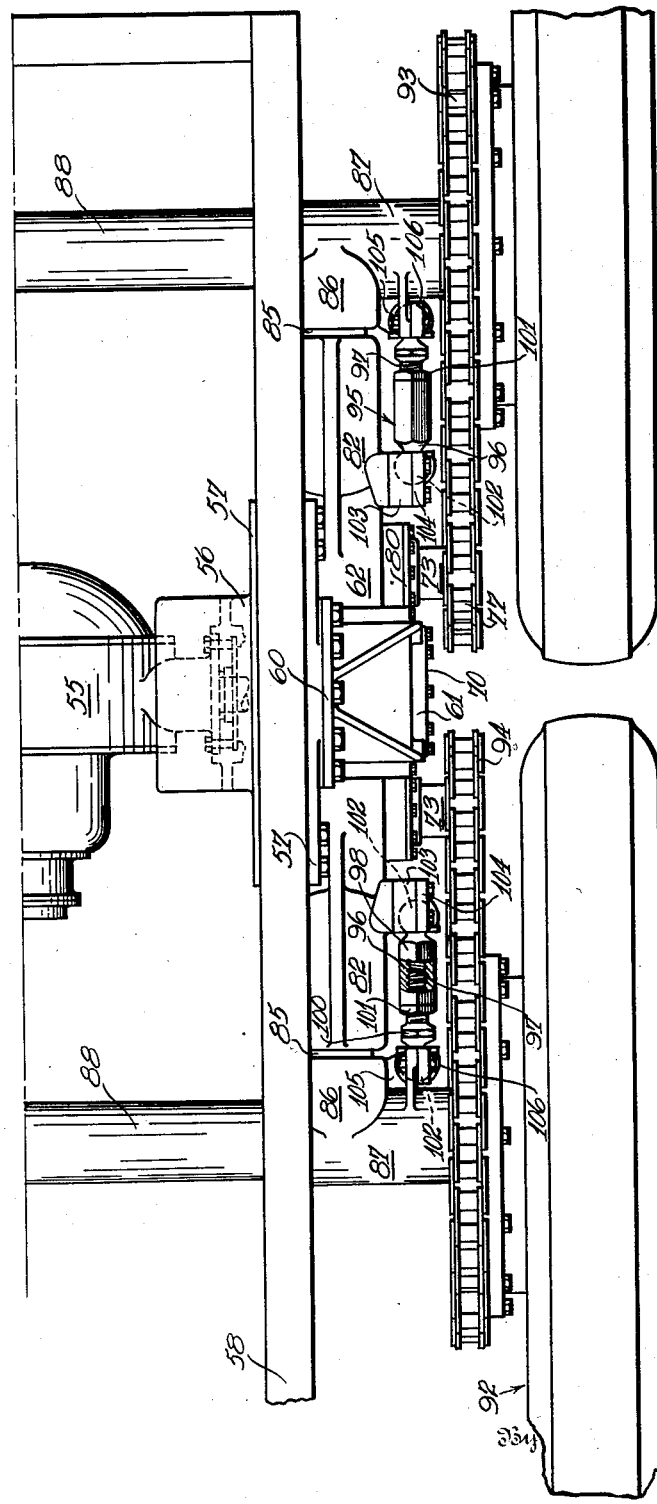
Inventor
Gustave A. Collender
Ralph L. Stevens
Attorney Patented June 22, 1943

2,322,279

UNITED STATES PATENT OFFICE 2,322,279

VEHICLE DRIVE MECHANISM

Gustave A. Collender, Los Angeles, Calif.

Application March 29, 1941, Serial No. 385,953

8 Claims. (Cl. 180—22)

The present invention relates to multiwheel vehicles of the type embodying six or more wheels and designed to travel over rough terrain as well as over normal roadways. A large part of the subject matter disclosed herein is carried forward from my co-pending application Ser. No. 359,127, filed September 30, 1940, in which division was required, and therefore the present case may be regarded as a continuation-in-part of the co-pending application.

The invention is particularly concerned with the construction of a truck or carriage for artillery, such as 75 m. m. anti-aircraft guns, for example. In present types of vehicle gun mountings, stabilizer jacks are necessary to maintain the gun platforms in sufficiently stable condition to afford fairly accurate firing while the vehicle is in motion. The need for such jacks is eliminated by the present invention, which provides an undercarriage that automatically maintains the gun mountings substantially level in spite of uneven roads or other irregular traction surfaces.

My invention further is concerned with a multiwheel vehicle that can carry heavy loads with effective and sufficient traction in the operations of excavating, mining and logging. Such operations normally are carried out without adequate road facilities for transportation of materials to be conveyed.

In the preferred form of my invention, the usual springs are eliminated and a tandem axle suspension is provided in which rigid beams are pivoted between their ends and connected at their ends to the axles in such manner that universal action is permitted and yet so that rotation of the axles is prevented. It is the primary object of the present invention to devise a practical unit of this type, particularly where the wheels are driven.

It is a major object of this invention to provide a tandem axle assembly of the character just discussed in which the wheels are driven by individual chains in such manner that the vehicle will continue to operate with a broken chain on either side or even with one chain broken at each side of the vehicle.

A further object of the invention is to devise novel means for conveniently and accurately adjusting the tensions of one or more pair of wheel driving chains. Preferably the adjustment means is a part of the suspension and is designed to permit normal or full flexibility of the latter.

Another important object of my invention resides in the provision of a walking beam type of tandem axle suspension unit in which the beam is designed to house gearing for transmitting driving torque from a source of power such as a differential unit to a set of chains which serve to drive the wheels. In this connection it is a further object to fully encase the gearing while providing protruding shafts that connect to the chains externally of the casing.

It is also a major object of the present invention to construct a walking beam in three parts comprising a central pivoted section for use as a gear casing, and two attached end sections designed for support by the tandem wheels at the same side of the vehicle.

It is another object of my invention to provide new and improved means for connecting the ends of a pair of rigid equalizing or walking beams to the ends of a pair of full transverse tandem axles in such manner that the axles may swing and tilt freely under any and all conditions while being held against rotation.

The foregoing and other important objects of my invention should clearly appear from a careful study of the following detailed description when taken in conjunction with the accompanying drawings and the appended claims. In the drawings:

Fig. 1 is a side elevational view of a vehicle incorporating one embodiment of the invention, with the wheels on the visible side cut away for clarity of illustration.

Fig. 2 is an enlarged fragmentary showing of the rear end of the vehicle of Fig. 1, with the wheels and their chain end sprocket driving mechanism cut away in vertical section.

Fig. 3 is a plan view of one side of the rear end of the same vehicle and of the differential unit, it being understood that the other side is identical.

Fig. 4 is a rear end view of the same vehicle, with the beam connections shown in section.

Fig. 5 is a sectional detail view taken on the plane of line 5—5 in Fig. 3.

Fig. 6 is another sectional view taken on the plane of line 6—6 in Fig. 2.

Fig. 7 is a view similar to Fig. 2 but showing a modified form of driving and suspension arrangement wherein the tension or slack of the driving chains is readily adjustable.

Fig. 8 corresponds substantially to Fig. 3 but is a top plan view of the apparatus of Fig. 7.

Fig. 9 represents a section taken substantially along the plane of line 9—9 in Fig. 7.

Fig. 10 represents another detailed section, taken on the plane of line 10—10 in Fig. 7.

With continued reference to the drawings, wherein like numerals are employed to designate like parts, and with attention first to the embodiment shown in Figs. 1 to 6, the illustrated vehicle comprises a framework including a pair of sturdy side channel members 10 supported at their front ends by the usual dirigible wheels 11 and at their rear ends by tandem sets of wheels 12. The longitudinal members 10 are joined by cross members, such as that seen at 13, Fig. 4. It is understood, of course, that the sets of wheels 12 need not have a particular location longitudinally of the framework and that they may be duplicated under certain conditions where a longer framework is utilized. The invention resides primarily in the manner in which these wheels 12 support the chassis and in the manner in which they are driven.

A bracket 14 is riveted, bolted or otherwise secured to the side of each channel member 10, and these brackets have integral downwardly offset sleeves 15 that are aligned transversely of the vehicle. Between these sleeves and bolted or otherwise secured thereto is disposed an axle bowl 16 containing a conventional differential unit 17 that is driven by a pinion 18 in usual manner from the vehicle power plant (Fig. 3). A pair of differentially driven axle shafts 20 extend from the unit 17 outwardly through and beyond the sleeves 15 in full floating manner to drive the wheels 12 through mechanism yet to be described.

Each sleeve 15 contains a pair of roller bearing assemblies 21 which serve as a pivotal mounting for a trunnion quill 22 that is integral with or rigidly attached to the inner side of a walking beam center section in the form of a longitudinally arranged gear casing 23 into which projects the outer end of one of the axle shafts 20, and to the ends of this center section are bolted or otherwise secured a pair of rigid solid extensions 24.

Each beam thus consists essentially of three aligned parts. The free ends of the extensions 24 terminate in semi-sleeves 25 that have spherically curved inner surfaces and to these sleeves are secured complemental end caps 26,—each set of parts 25 and 26 serving to form a complete sleeve of internally spherical curvature.

Housed within each sleeve thus formed is a cylindrical sleeve 27 having an integral ball-shaped portion 28 that is adapted for free universal action within the spherically curved seat formed by the outer sleeve. Cut transversely through the seat just mentioned is a slot 30 that has flat sides and a spherically curved bottom (Figs. 5 and 6). This slot, in cooperation with a key 31 carried by the ball 28 is designed to prevent appreciable relative rotation of the interlocked parts. The slot is slightly wider than the key for a purpose later explained, and the bottom of the key is spherically curved so as not to interfere with the remaining universal action.

The multiwheel unit at the rear includes two full transverse idle axles 32 which have reduced end portions 33 that extend slidably through the sleeves 27 and rotatably support the wheels 12. As the wheels and axles carry cooperating brake mechanisms in usual manner, the axle ends have keyways 34 for reception of keys 35 that are interlocked with the sleeves 27 to transmit braking torque from the axles to the walking beams by way of the larger keys 31. Although all four sleeves 27 slide onto the axle ends 33 during assembly, two of them—at diagonally opposite corners of the suspension—can partake of no sliding movement during operation because they are confined rather closely between the wheel brake units and the shoulders which mark the point of axle enlargement. At the other two diagonally opposite corners of the suspension, however, clearances 37 and 38 are provided (Figs. 3, 4 and 6) so that sufficient relative sliding movement may take place to permit the axles 32 to tilt freely during operation. This is essential because the two beams are rigid and always swing in parallel planes.

The provision of clearances 37 and 38 at only one end of each axle ensures that the vehicle framework shall not shift bodily sideways relative to the undercarriage. The keys 31 assist in preventing sidesway because their curved surfaces prevent any purely lateral or lineal movement of the beam ends 25 relative to the balls 28. The purpose of the slight clearances in the slots 30 adjacent the sides of the keys 31 (Fig. 5) is to permit a very slight oscillation of either end of each axle in response to swinging and tilting movements thereof. In the absence of such an arrangement there would be a tendency to twist the axles at times and thus damage the joints due to the non-yielding character of the suspension beams. However, it is necessary to provide such clearance for only one key 31 of each axle, and this practice is preferable because it affords stronger and more positive torque transmission means for braking reactions.

Thus, a multiwheel unit is provided embodying full transverse axles and rigid walking beams, with no yielding or resilient material anywhere between the axles and the chassis frame, and yet which is capable of traveling at high speed over uneven terrain with complete flexibility of the axles, universal action in the joints and transmission of braking torque to the frame. Of important notice is the fact that in spite of the full universal action, torque reactions are transmitted from the axles to all four ends of the two walking beams.

The brake drums 40 of the wheels 12 have sprocket rims 41 secured thereto and driven by roller link chains 42 that pass around sprocket wheels 43 which are disposed just outside the center sections 23 of the walking beams. These wheels 43 are secured to transverse shafts 44 which extend into the casing sections 23 for splined or keyed interconnection with gears 45, which are straddle mounted in the casings by suitable bearings as shown in Fig. 3. Each pair of gears 45 is in mesh with a primary gear 46 that is keyed at 47 upon the outer or floating end of one of the axle shafts 20, it likewise being straddle mounted in the casing by suitable bearings. A cap 48 (Fig. 1) serves as a closure and retainer for one of the bearings, and further caps or plates 50 (Fig. 2) are secured to the casing section adjacent the outer bearings for the shafts 44.

In operation, the differentially driven shafts 20 actuate the gears 46 each of which in turn drives both of its associated gears 45, the latter thus rotating in opposite directions to actuate the chain and sprocket mechanisms so that the wheels 12 will rotate in unison in the same direction. The chains are not much exposed to damage from projectiles and flying fragments of warfare, but should one become broken or should one at each side be broken the vehicle will continue to operate. Should both chains at one side be removed, emergency operation still can be obtained by interlocking the exposed sprocket wheels 43 with a broken piece of chain or by a block or in other suitable manner, and then the wheels at the other side will drive the vehicle. The use of chains has the advantage that they can be repaired quickly and easily by a mechanic if a few spare links are carried in the tool box. Given proper attention, chains are noiseless and will withstand high speed operation for prolonged periods.

As aforestated, although the suspension embodies no springs and consists in itself of nothing more than a trunnion pivot and a pair of gear box extensions which connect with the wheel axles, the axle ends swing and tilt freely without tilting the vehicle framework appreciably and without damage to any of the parts.

The structure thus far described has been carried forward from the above mentioned copending application, without change. Figs. 7 to 10 illustrate a modified construction which normally will be used to transport lighter loads. Its chief differences over the first embodiment reside in connections from the walking beams to the axles and the incorporation therein of chain adjustments.

In the modification there is a differential housing 55 having each of its coaxial flanged open ends secured to a sleeve 56 that is formed integral with a bracket 57, the latter being rigidly joined to the reenforced frame channel 58, as shown (Figs. 8 and 9). A second bracket 60 likewise is united to the channel and it carries an integral sleeve 61 in spaced alignment with the sleeve 56, these sleeves having bearings as shown in Fig. 9 for pivotally mounting the center section 62 of one of the modified walking beams, the center section 62 having coaxial cylindrical extensions 63, 64 for that purpose.

The sections 62 are designed to house and support gearing consisting of a pinion 65 in mesh with a pair of gears 66 through teeth that preferably are helically cut as shown in Fig. 7. The pinion has a splined connection with one of the differentially driven shafts 67 (Fig. 9) and is straddled by anti-friction bearings 68 which serve to journal the outer end of the shaft within the walking beam. A closure cap 70 is fitted to the sleeve 63 and engages one of the bearings 68. A plate 71 closes the bottom of the gear casing. The sleeves 56 and 64 are designed to form annular pockets 72 for conventional grease retainers that check the flow of lubricant from the differential housing to the housing section 62—it being preferable to supply lubricant independently to the latter.

The two gears 66 are splined individually upon short shafts 73 and likewise are straddle mounted in the casing 62, by bearings 74, 75. These shafts extend beyond the casing into keyed connection with a pair of flanged sleeves 76 each of which has secured thereto a sprocket rim 77, as shown (Fig. 10). The united sleeves and sprockets are adjustably retained on their shafts by lock nut assemblies 78. A collar 80, having a channel 81 for a grease retainer is secured to casing 62 in engagement with one of the bearings 75.

The housing 62 has a pair of integral end extensions 82 that include aligned cylinders 83 which are lined with antifriction sleeves 84 and which open outwardly towards front and rear, respectively, of the vehicle. Each liner 84 slidably and rotatably receives a hollow plunger 85 (Fig. 7) in such manner that one end of the plunger is substantially spaced from the closed end of the cylinder while the other end of the plunger extends slightly beyond the open end of the cylinder. Each plunger is integral with a block 86 which in turn is integral with a sleeve 87 that surrounds an end of one of the axles 88. Generally speaking, the sleeves 87 correspond with the sleeves 27 of Figs. 4 and 6, being carried by the reduced ends of the axles and being so constructed and arranged that two of them in the complete suspension assembly are non-rotatably held by keys 90 (Fig. 7) while the other two are oscillatible upon sleeve bearings 91. As in the first embodiment, the keyed corners of the suspension are diagonally opposed. Likewise, the axles are supported by wheel units, 92, which carry sprocket wheels 93 driven from the sprocket rims 77 by chains 94.

Thus it will be seen that the axles may swing and tilt freely while transmitting driving and/or braking torque reactions to the frame. Means must be provided, however, to position the axles longitudinally of the vehicle—or in other words, to prevent the plungers 85 from reciprocating in their cylinders. A preferred form of such means is illustrated and comprises the following parts.

Each cylinder 82 is coupled to its associated plunger-carrying sleeve 87 by a multi-part rod 95, comprising an internally threaded elongated nut 96 and a complemental externally threaded bolt 97. The nut and bolt have wrench surfaces 98 and 100, respectively, so that the length of the rod may be varied by relative rotation, and a jam nut 101 is provided for locking them in selected adjustment. At its unthreaded end each member 96, 97 terminates in an integral spherically curved ball 102.

Each cylinder 82 has an integral offset socket 103 shaped to complementally receive a portion of one of the balls 102; and to this socket there is detachably secured a cap 104, likewise formed to complementally fit another portion of the same ball, so that the ball can oscillate universally but cannot escape. In like manner each block 86 has an integral halfsocket 105 to which is secured a complemental cap 106, for universal reception of the ball 102 at the other end of the rod.

The four rods 95 thus maintain the two axles in definitely spaced relation to each other and in perpendicularity to the longitudinal axis of the vehicle, without intefering with the freedom of axle movement permitted by the plunger and cylinder connections. The adjustment feature of the rods permits the chains to be removed readily for repairs, and can be utilized conveniently to take up slack in the chains at intervals as they wear from operation.

The plunger and cylinder devices with their associated ball-ended rods of course can be applied to other types of axle-supported arms to afford universal connections from the arms to the axles, and the wheels need not necessarily be driven, but these disclosed connections find their maximum usefulness where driving chains are employed.

The general modes of operation and functioning are of course substantially the same as for the first described embodiment.

It is to be understood that the invention is not restricted to the illustrated details of the disclosed embodiments, and that various changes may be made without departing from the spirit of the invention as set forth in the appended claims.

What is claimed is:

1. In a multiwheel vehicle having a framework and tandem sets of wheels disposed adjacent the sides thereof, a suspension at each side comprising a walking beam supported at its ends by certain of the wheels and pivotally connected between its ends to means carried by the framework, said walking beam having a cavity containing gearing adjacent its pivotal axis, means for driving the gearing comprising a shaft extending into the gearing at the pivotal axis of the beam, and means connected between said gearing and at least one of the adjacent wheels to drive the latter, the last mentioned means comprising two short shafts extending from the gearing outwardly of the beam and mechanism connecting said short shafts individually to their respective adjacent wheels.

2. In a vehicle having a framework and supporting wheels adjacent the sides thereof, a wheel driving and suspension unit comprising an arm pivotally connected at one point to the framework and supported at a remote point by one of the wheels, said arm having a cavity adjacent its pivotal point and there being a pair of intermeshed gears in said cavity, means for driving one of said gears and the other gear having a shaft extending to the outside of the cavity, a sprocket wheel on said shaft and a sprocket wheel on the supporting wheel, and a chain encompassing the sprocket wheels.

3. In a multiwheel vehicle having a framework and a pair of idle axles disposed therebeneath in tandem, sets of wheels supporting said axles and having sprocket wheels attached thereto, a walking beam pivoted between its ends at each side of the frame and having its ends adjacent said axles, a sleeve surrounding each axle end and at least two of said sleeves being non-rotatable relative to their axle ends, means connecting said sleeves to the adjacent beam ends so that the axles may tilt without twisting the beams, driving sprockets carried by the beams and chains extending from said sprockets to said sprocket wheels.

4. In the combination set forth in claim 3, each of said connecting means comprising two complemental parts consisting of a telescoped plunger and cylinder arranged substantially horizontally, one of said parts being rigidly joined to a sleeve and the other being rigidly joined to the associated beam end.

5. In a multiwheel vehicle having a framework and tandem sets of wheels disposed adjacent the sides thereof, transverse axles supported by the wheels, a suspension at each side of the vehicle comprising a walking beam pivoted between its ends upon means carried by said framework between the axles, and devices affording swiveling load-supporting connections between the beam ends and its adjacent axle ends, each device comprising an elongated longitudinally arranged cylinder containing a plunger, the plunger and cylinder being relatively rotatable and these two parts having their non-telescoped ends attached individually to the adjoined axle and beam ends.

6. In the construction defined in claim 5, each device further including a rod substantially parallel to the cylinder and adjustable in length, and universal connections between the ends of said rod and the beam and axle ends respectively.

7. In a multiwheel vehicle having a framework and a pair of tandem sets of supporting wheels, a bracket secured to each side of the framework and having a rigid transverse sleeve, a differential housing transversely arranged adjacent the vehicle center line, in alignment with the sleeves and united thereto, a walking beam at each side of the framework and having between its ends a rigid offset sleeve projecting pivotally into one of the first mentioned sleeves, the ends of said beams being supported by the tandem sets of wheels, differentially driven shafts within said housing and projecting outwardly beyond the assembled sleeves, mechanism for driving said wheels from the outer ends of said shafts, and a second pair of brackets, one at each side of the framework and having a transverse sleeve aligned with the adjacent first mentioned transverse sleeve, the rigid offset sleeve of the corresponding beam having sufficient length to project pivotally into said sleeve of one of said second pair of brackets.

8. In a vehicle having a framework and transversely aligned supporting wheels adjacent the sides thereof, a load supporting arm pivotally connected to each side of the framework and extending horizontal into proximity to one of said wheels, an axle connected between the wheels, a device for connecting each arm to an end of said axle, said device comprising a pair of slidably telescoped members attached to the arm and the axle respectively in horizontal load-sustaining position, means for locking said members in selected telescoped adjustment, said arms carrying driving sprockets and said wheels having driven sprocket wheels, chains encompassing the sprockets and sprocket wheels, and said telescoped members having sufficient capacity of adjustment to maintain said chains under proper tension.

GUSTAVE A. COLLENDER.